United States Patent
Mody et al.

(10) Patent No.: US 10,356,172 B2
(45) Date of Patent: Jul. 16, 2019

(54) AUTOMATIC FILE STORAGE AND SHARING

(71) Applicant: Dropbox, Inc., San Francisco, CA (US)

(72) Inventors: Viraj Mody, San Francisco, CA (US);
Anand Subramani, San Francisco, CA (US); Dima Ryazanov, Foster City, CA (US); Tina Wen, Oakland, CA (US);
Stefano Cayre, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 333 days.

(21) Appl. No.: 14/755,402

(22) Filed: Jun. 30, 2015

(65) Prior Publication Data

US 2017/0006102 A1 Jan. 5, 2017

(51) Int. Cl.
G06F 15/16 (2006.01)
H04L 29/08 (2006.01)

(52) U.S. Cl.
CPC .......... *H04L 67/1097* (2013.01); *H04L 67/06* (2013.01)

(58) Field of Classification Search
CPC ............................ H04L 67/1097; H04L 67/06
USPC ........................................................ 709/219
See application file for complete search history.

(56) References Cited

U.S. PATENT DOCUMENTS

| | | | |
|---|---|---|---|
| 5,621,672 A * | 4/1997 | Kobayashi | G05B 19/4141 700/4 |
| 5,642,509 A * | 6/1997 | Ohshima | G06F 9/3879 719/318 |
| 6,684,212 B1 | 1/2004 | Day et al. | |
| 6,687,741 B1 | 2/2004 | Ramaley et al. | |
| 7,206,806 B2 | 4/2007 | Pineau | |
| 7,401,104 B2 | 7/2008 | Shah et al. | |
| 7,444,390 B2 | 10/2008 | Tadayon et al. | |
| 7,676,526 B1 | 3/2010 | Beloussov et al. | |
| 7,734,690 B2 | 6/2010 | Moromisato et al. | |
| 7,756,892 B2 | 7/2010 | Levy | |
| 7,836,132 B2 | 11/2010 | Qureshi et al. | |

(Continued)

OTHER PUBLICATIONS

Kosht, "Comparing mobile operating systems and application environments", 2015, (https://searchmobilecomputing.techtarget.com/tip/Comparing-mobile-operating-systems-and-application-environments), all.*

(Continued)

*Primary Examiner* — Anthony Mejia
(74) *Attorney, Agent, or Firm* — Fenwick & West LLP

(57) ABSTRACT

Described embodiments enable the automatic uploading and sharing of objects via a content management system (CMS). A user of a client device may request to share an object via a user interface. Prior to the request, the object may be stored in a storage location of the client device that is not synchronized with the CMS. In one embodiment, client software detects a "click-and-drag" operation of an object and provide a sharing element into which an object may be dropped for sharing. The CMS receives the sharing request and may automatically initiate a sharing process comprising receiving the object from the client device, storing the object in the CMS, generating a link to the object, and sending the link to indicated or pre-determined recipient(s). In various embodiments, the objects are synchronized with the CMS and/or organized according to various object parameters within a directory of the CMS.

15 Claims, 9 Drawing Sheets

(56) References Cited

U.S. PATENT DOCUMENTS

| | | | |
|---|---|---|---|
| 7,961,184 B2* | 6/2011 | Nozaki | G06T 19/20 345/419 |
| 7,970,850 B1* | 6/2011 | Callanan | H04L 51/046 709/206 |
| 7,996,450 B1* | 8/2011 | Lee | G06F 16/972 707/899 |
| 8,019,822 B2 | 9/2011 | Martino et al. | |
| 8,060,537 B2 | 11/2011 | Murakami et al. | |
| 8,065,424 B2 | 11/2011 | Foresti et al. | |
| 8,140,506 B2 | 3/2012 | Pennington | |
| 8,194,940 B1 | 6/2012 | Kiyohara et al. | |
| 8,412,792 B2 | 4/2013 | Young | |
| 8,612,393 B2* | 12/2013 | Huang | G06F 8/658 707/655 |
| 8,825,597 B1* | 9/2014 | Houston | H04L 67/06 707/610 |
| 9,049,176 B2 | 6/2015 | Ferdowsi et al. | |
| 9,088,765 B2* | 7/2015 | Seto | G11B 27/34 |
| 9,143,939 B2* | 9/2015 | Nagasaki | H04L 41/0806 |
| 9,575,712 B2* | 2/2017 | Farouki | H04L 12/1822 |
| 9,619,348 B2* | 4/2017 | Uehara | G06F 9/485 |
| 2001/0032170 A1* | 10/2001 | Sheth | G06Q 10/0631 705/37 |
| 2002/0156869 A1* | 10/2002 | Wong | H04L 29/06 709/219 |
| 2002/0194195 A1* | 12/2002 | Fenton | G06F 16/447 |
| 2003/0004952 A1* | 1/2003 | Nixon | G05B 19/4145 |
| 2003/0014477 A1 | 1/2003 | Oppenheimer et al. | |
| 2003/0097410 A1 | 5/2003 | Atkins et al. | |
| 2003/0120729 A1 | 6/2003 | Kim et al. | |
| 2003/0152904 A1 | 8/2003 | Doty, Jr. | |
| 2003/0227487 A1 | 12/2003 | Hugh | |
| 2004/0034621 A1* | 2/2004 | Tanaka | G06F 9/4493 |
| 2004/0044746 A1 | 3/2004 | Matsusaka | |
| 2004/0172423 A1* | 9/2004 | Kaasten | G06F 17/30176 |
| 2004/0199514 A1* | 10/2004 | Rosenblatt | G06F 16/176 |
| 2004/0263870 A1* | 12/2004 | Itoh | G06F 3/1204 358/1.1 |
| 2004/0267808 A1* | 12/2004 | Matsushima | H04L 67/02 |
| 2005/0076030 A1 | 4/2005 | Hada et al. | |
| 2005/0091289 A1 | 4/2005 | Shappell et al. | |
| 2005/0122336 A1* | 6/2005 | Furuichi | G06F 16/2428 345/522 |
| 2005/0240428 A1 | 10/2005 | Gabrick et al. | |
| 2006/0069783 A1* | 3/2006 | Aihara | H04L 29/1216 709/227 |
| 2006/0095514 A1 | 5/2006 | Wang et al. | |
| 2006/0133407 A1 | 6/2006 | Kuisma | |
| 2006/0168531 A1* | 7/2006 | Sato | G06F 3/038 715/751 |
| 2006/0230030 A1 | 10/2006 | Volpa et al. | |
| 2006/0230128 A1* | 10/2006 | Chung | H04L 12/2807 709/223 |
| 2007/0016613 A1 | 1/2007 | Foresti et al. | |
| 2007/0038688 A1 | 2/2007 | Morrill | |
| 2007/0130143 A1* | 6/2007 | Zhang | G06F 16/972 |
| 2007/0174341 A1 | 7/2007 | Saripalli et al. | |
| 2007/0203917 A1 | 8/2007 | Du et al. | |
| 2007/0214169 A1 | 9/2007 | Audet et al. | |
| 2007/0233875 A1* | 10/2007 | Raghav | G06Q 10/107 709/227 |
| 2007/0235537 A1* | 10/2007 | Yoneda | G06F 13/102 235/435 |
| 2007/0239760 A1 | 10/2007 | Simon | |
| 2007/0260747 A1 | 11/2007 | Samzelius et al. | |
| 2008/0052514 A1* | 2/2008 | Nakae | G06F 21/6218 713/168 |
| 2008/0208963 A1 | 8/2008 | Eyal et al. | |
| 2008/0216139 A1 | 9/2008 | Liwerant et al. | |
| 2009/0064284 A1* | 3/2009 | Poston | G06F 21/10 726/4 |
| 2009/0216569 A1 | 8/2009 | Bonev et al. | |
| 2009/0271708 A1* | 10/2009 | Peters | G06F 17/24 715/738 |
| 2009/0287715 A1 | 11/2009 | Chi et al. | |
| 2010/0146123 A1* | 6/2010 | Park | G06F 9/5077 709/226 |
| 2010/0162229 A1* | 6/2010 | Tsuk | G06F 9/44526 717/175 |
| 2010/0185698 A1 | 7/2010 | Lee et al. | |
| 2010/0211998 A1 | 8/2010 | Soelberg et al. | |
| 2010/0274864 A1 | 10/2010 | Jalili | |
| 2011/0055721 A1 | 3/2011 | Jain et al. | |
| 2011/0137986 A1 | 6/2011 | Wolf | |
| 2011/0154456 A1 | 6/2011 | Machani | |
| 2011/0161428 A1* | 6/2011 | Hu | G06F 9/54 709/206 |
| 2011/0167159 A1 | 7/2011 | Bethlehem et al. | |
| 2011/0179412 A1* | 7/2011 | Nakae | G06F 21/53 718/1 |
| 2011/0213806 A1* | 9/2011 | Zuber | G06F 16/93 707/784 |
| 2011/0264532 A1 | 10/2011 | Chan et al. | |
| 2011/0276638 A1 | 11/2011 | Errico et al. | |
| 2011/0287748 A1 | 11/2011 | Angel et al. | |
| 2011/0299121 A1* | 12/2011 | Kaku | H04N 1/4413 358/1.15 |
| 2012/0066237 A1* | 3/2012 | Chen | G06F 17/2247 707/754 |
| 2012/0084188 A1* | 4/2012 | Zuber | G06Q 10/10 705/34 |
| 2012/0151002 A1 | 6/2012 | Lin et al. | |
| 2012/0197980 A1 | 8/2012 | Terleski et al. | |
| 2012/0209892 A1 | 8/2012 | MacAskill et al. | |
| 2012/0216063 A1* | 8/2012 | Ogata | G06F 1/3284 713/323 |
| 2012/0278404 A1 | 11/2012 | Meisels et al. | |
| 2012/0290686 A1 | 11/2012 | Anchan | |
| 2012/0324121 A1 | 12/2012 | Carr | |
| 2012/0331108 A1 | 12/2012 | Ferdowsi et al. | |
| 2013/0013561 A1 | 1/2013 | Chan et al. | |
| 2013/0174272 A1 | 7/2013 | Chevalier et al. | |
| 2013/0198270 A1* | 8/2013 | Yamauchi | G06F 13/00 709/203 |
| 2013/0227014 A1* | 8/2013 | Song | H04L 67/025 709/204 |
| 2013/0262914 A1* | 10/2013 | Mao | G06F 11/0709 714/4.2 |
| 2013/0305039 A1* | 11/2013 | Gauda | G06F 21/6218 713/153 |
| 2014/0052986 A1* | 2/2014 | Kanai | H04L 63/0428 713/168 |
| 2014/0052993 A1* | 2/2014 | Isozaki | H04L 63/0428 713/175 |
| 2014/0075307 A1 | 3/2014 | Bargas et al. | |
| 2014/0344901 A1* | 11/2014 | Fu | H04L 67/06 726/4 |
| 2015/0040068 A1* | 2/2015 | Puckett | G06F 3/04847 715/833 |
| 2015/0154291 A1* | 6/2015 | Shepherd | H04L 65/403 707/748 |
| 2015/0381716 A1* | 12/2015 | Moon | H04L 67/104 713/171 |
| 2016/0077777 A1* | 3/2016 | Kobayashi | G06F 3/1205 358/1.15 |
| 2016/0173381 A1* | 6/2016 | Batra | H04L 47/122 709/213 |
| 2017/0250830 A1* | 8/2017 | Chang | H04L 12/14 |
| 2017/0310829 A1* | 10/2017 | Kimura | G06F 3/1204 |
| 2018/0351737 A1* | 12/2018 | Tanizawa | H04L 9/0852 |
| 2018/0357846 A1* | 12/2018 | Chen | G07C 9/00309 |

OTHER PUBLICATIONS

PCT International Search Report and Written Opinion, PCT Application No. PCT/US2011/041531, dated Apr. 6, 2012, 8 pages.

* cited by examiner

AUTOMATIC FILE STORAGE AND SHARING

CROSS REFERENCE TO RELATED APPLICATION

This application is related to U.S. patent application Ser. No. 13/217,944, filed Aug. 25, 2011, and titled "FILE SHARING VIA LINK GENERATION", the contents of which are hereby incorporated by reference.

BACKGROUND

The described embodiments generally relate to sharing information among devices, and particularly to automatically storing and synchronizing files on a content management system and sharing a link to the synchronized files.

Some content management systems permit devices to synchronize files with the content management system and other devices. A device stores a local copy of files. When files are added, deleted, and edited on the device, these modifications are sent to the content management system for storage and synchronization with the other devices. Users of content management systems may share files stored on a content management system, but sharing files via a content management system can be complicated and time consuming. For example, a user may have to download a local copy of the file from the content management system and then provide the file to others, for example as an e-mail attachment.

SUMMARY

Described embodiments enable the automatic uploading and sharing of files via a content management system. An object (e.g., a file, a folder and its included files, etc.) is stored on a client device. A user of the client device may initiate a request to share the object via client software of the content management system executing on the client device. In various embodiments, a request is initiated via a user interface element generated by the client software. For example, client software may detect a "click-and-drag" operation of an object and provide a sharing element on a display of the client device. If the user "drops" the object over the sharing element, the client software automatically sends a sharing request to the content management system. In one embodiment, the client software prompts the user of the client device for one or more recipients for the sharing request. Sharing requests may be initiated in different manners in different embodiments, including choosing sharing options from context-sensitive menus or other user interface constructs within applications executing on the client device.

An automatic link engine (ALE) of the content management system receives the sharing request and automatically initiates a sharing process. In one embodiment, the sharing process comprises receiving the object from the client device, storing the object in the content management system, generating a link to the object, and sending the link to the recipient(s).

In various embodiments, objects are synchronized with the content management system such that a user may access objects via other computing devices. Shared objects may be stored together in a directory on content management system that allows a user to view and/or access the shared objects. The shared objects may be organized according to various parameters (e.g., object type, share date, etc.).

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1A:
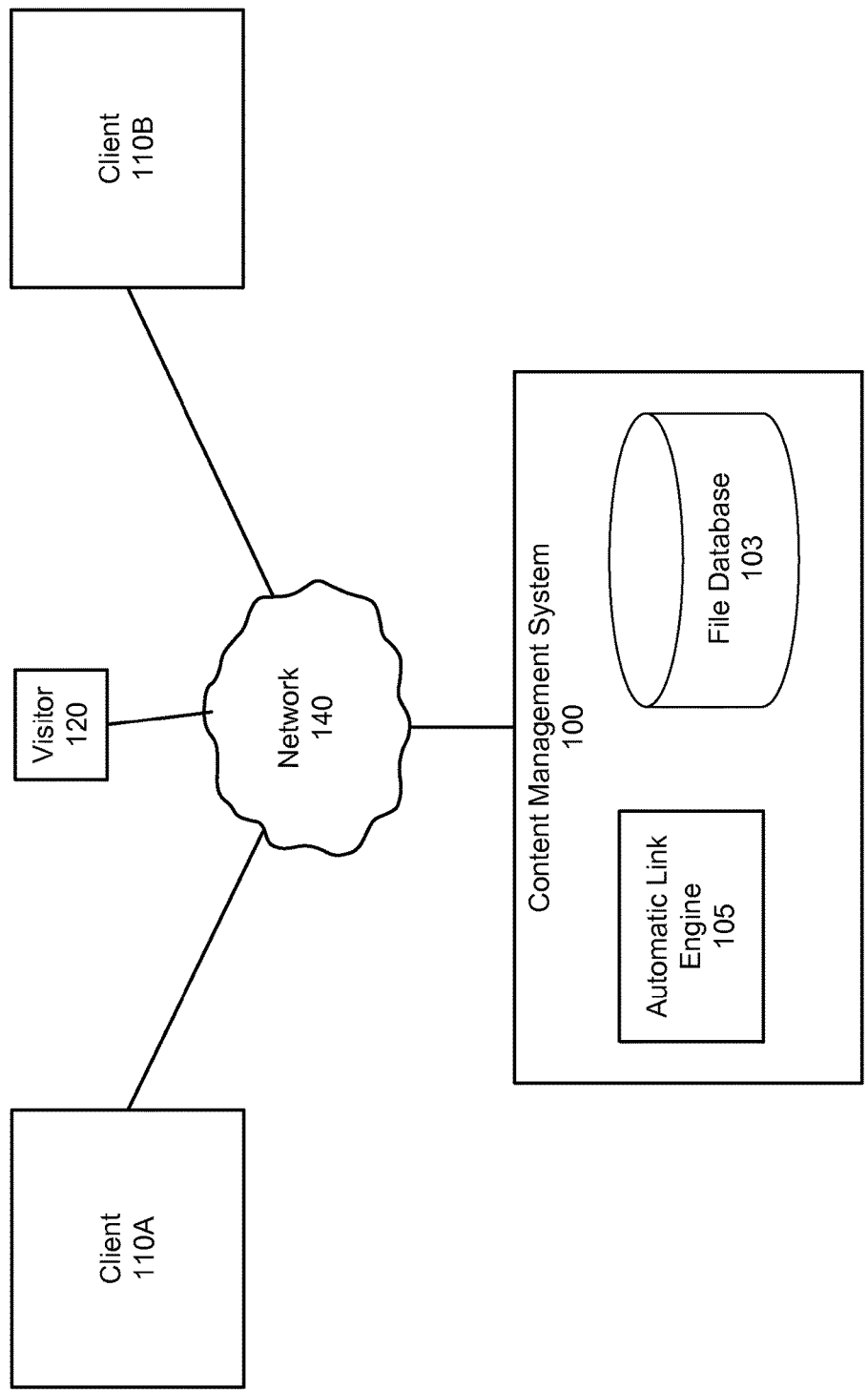
FIG. 1A illustrates an example computing environment for a content management system in accordance with one embodiment.

FIG. 1A illustrates an example computing environment for a content management system 100 in accordance with one embodiment. Content management system 100 includes automatic link engine 105 and file database 103. Automatic link engine 105 provides functionality for automatic file upload and sharing as described below. File database 103 provides network file storage for clients 110A and 110B of a file access service that includes content management system 100. For example, a first client 110A may store one or more objects (e.g., files, folders, etc.) in file database 103; a second client 110B may store one or more objects in file database 103. In some embodiments, software executing on the client 110 integrates the network-stored objects with the client's local file system to enable a user to manipulate the network-stored objects through the same user interface (UI) as is used to manipulate objects on the local file system, e.g., via a file explorer. In some embodiments, clients 110 may additionally maintain a cache of the objects stored in storage 103, to improve speed and reliability. Those of skill in the art will recognize that various methods exist to maintain synchronization between local and network based files. In other embodiments, clients 110 access objects via a web interface, or through a custom-designed client installed on a client device. Devices might include, for example, a desktop or laptop computer, a tablet computing device, or a handheld computing device such as a personal digital assistant or a smart phone (e.g., an IPHONE or BLACKBERRY, or an ANDROID-based smart phone). One provider of a suitable file access service is Dropbox Inc., of San Francisco, Calif.

FIG. 1A illustrates only two clients, 110A and 110B, for purposes of clarity. When implemented, content management system 100 may be in communication with thousands or millions of clients, and each client may store one or multiple files on content management system 100. When represented to the user, the files may be arranged in folders; and folders themselves may be arranged in other folders, as determined by the user; however the underlying storage architecture may be considerably different, and implemented to maximize storage efficiency, and without necessarily mirroring each user's file hierarchy. Content management system 100 and its components may be implemented using any appropriate hardware for performing file serving and storage—solely for clarity of illustration and description, FIG. 1A illustrates only a single content management system, and one instance of relevant file stores and modules. Additionally, many components required for operation of a content management system and service, known to those of skill in the art but not germane to this description—for example, network cards, CPUs, memory, and the like—are omitted for clarity.

FIG. 1A also illustrates a visitor device 120, to which a sharable link can be provided. As described further below, a visitor 120 need not have client software installed, and need not be associated with a user of file access server 100, in order to access files via a shared link.

Network 140 represents the communication pathways between the client devices 110 and the content management system 100. In one embodiment, the network 140 uses standard Internet communications technologies and/or protocols. Thus, the network 140 can include links using technologies such as Ethernet, IEEE 802.11, IEEE 806.16, WiMAX, 3GPP LTE, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

Content management system 100 comprises an automatic link engine 105 that automatically uploads a file, generates a link, and shares the link responsive to a sharing request. In one embodiment, automatic link engine 105 further enables file access by users other than those who initially provided the files. The automatic link engine 105 is described further below with respect to FIG. 3.

Figure 1B:
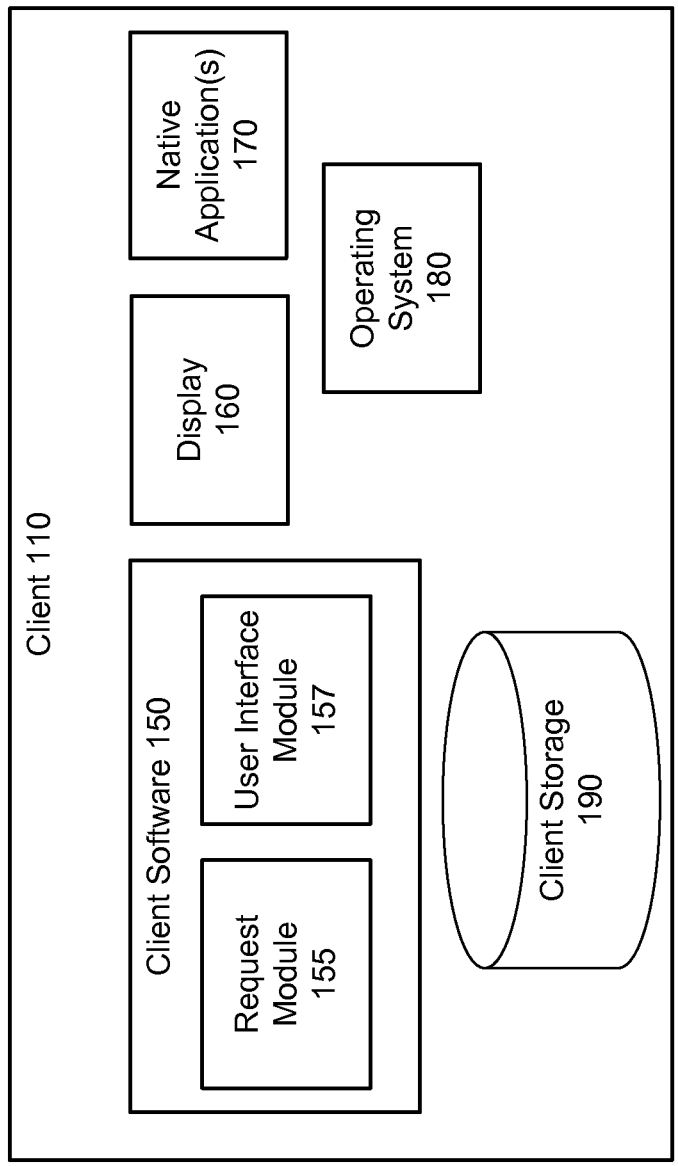
FIG. 1B is a block diagram illustrating the components of an example client for automatically uploading and sharing a file, according to one embodiment.

FIG. 1B is a block diagram illustrating components of an example client 110, according to one embodiment. In this embodiment, client 110 includes client software 150, display 160, one or more native applications 170, operating system 180, and client storage 190.

Native applications 170 vary based on the client device, and may include various applications for creating, viewing, consuming, and modifying content stored on content management system 100, such as word processors, spreadsheets, database management systems, code editors, image and video editors, e-book readers, audio and video players, and the like. Operating system 180 on each device provides a local file management system and executes the various software modules such as client software 150 and native applications 170.

Client software 150 can be a dedicated application or module that provides access to the services of content management system 100, providing both user access to shared files through a user interface, as well as programmatic access for other applications. Client 110 may also access content management system 100 through a web browser of client 110. As an alternative, client software 150 may integrate access to content management system 100 with the local file management system provided by operating system 180. When access to content management system 100 is integrated in the local file management system, a file organization scheme maintained at content management system 100 is represented as a local file structure by operating system 180 in conjunction with client software 150. Client software 150 may take various forms, such as a stand-alone application, an application plug-in, or a browser extension. Client storage 190 may include one or more types of non-transitory computer-readable persistent storage media. For example, the client storage 190 may include a hard drive, solid-state memory device, and/or other form of persistent memory. Client software 150 includes request module 155 for creating and sending sharing requests, and user interface module 157, which are discussed in more detail below.

FIGS. 2A-E show instances of an example user interface for automatically uploading and sharing objects (e.g. files, folders, etc.), according to one embodiment. The example user interface may be generated by user interface module 157 and shown on display 160 of client 110. The example user interface of FIG. 2A includes desktop 210 and file system window 215. File system window 215 includes a list of files 220 stored in client storage 190. In various embodiments, one or more files 220 are displayed on desktop 210 or in a window of a native application 170. In one embodiment, files 220 are not yet stored on content management system 100. The example user interface may receive user input from a cursor that is controlled by a user input device (e.g., mouse, trackpad, keyboard, etc.). In another embodiment, client 110 is executed by a device having a touchscreen, which allows interaction with user interface elements by performing various gestures on the touchscreen.

Figure 2A:
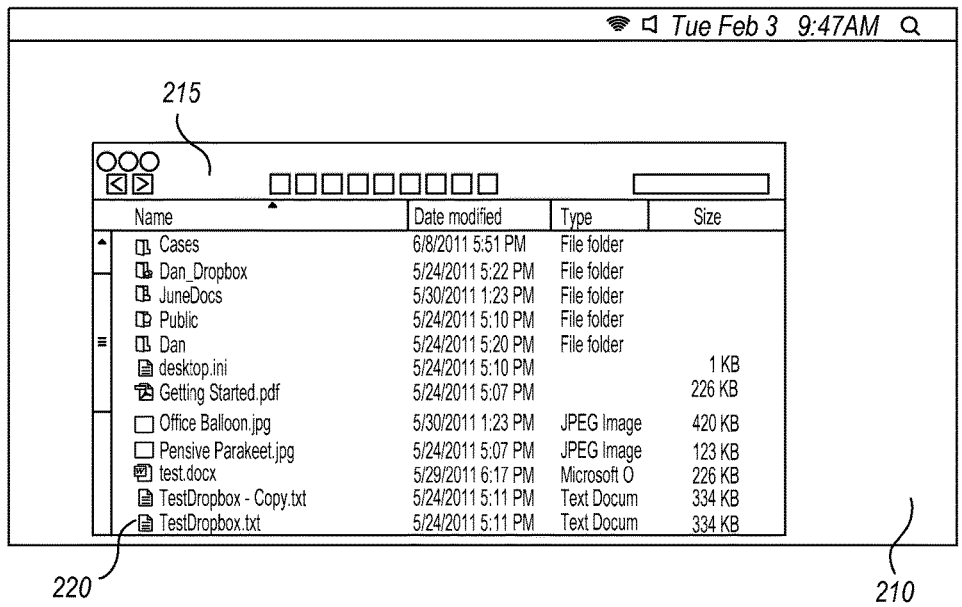
FIGS. 2A-E show instances of an example user interface for automatically uploading and sharing a file, according to one embodiment.
Figure 2B:
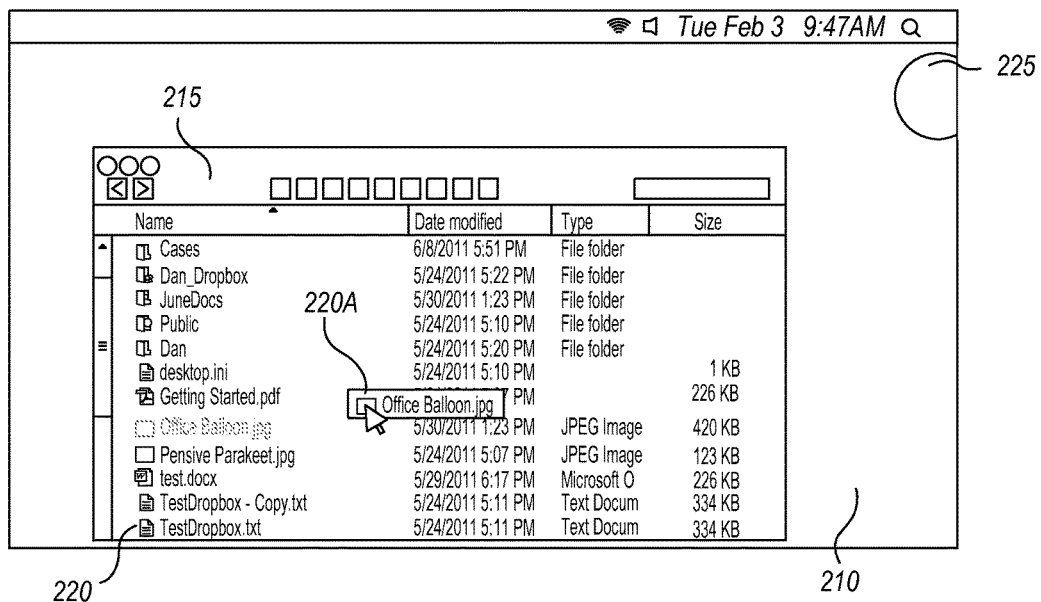

FIG. 2B shows a sharing element 225 that in one embodiment appears on the display when a user performs a specific action on an object such as file 220A (e.g., a click-and-drag action). The sharing element 225 may be generated by user interface module 157. User interface module 157 may communicate with operating system 180 to detect click-and-drag actions and other actions. For example, user interface module 157 may request to be notified when a click-and-drag action occurs on an object within operating system 180. The client software may further request attributes of the object (e.g., where the object is stored, whether the object is a file, the type of file, etc.). In one embodiment, if an object is the subject of a click-and-drag action, user interface module 157 generates and displays sharing element 225 on display 160. In one embodiment, user interface elements on display 160 are displayed in layers, and the sharing element 225 is displayed on top of other user interface elements on the display such that it is visible even if other user interface elements (e.g., windows) are present on the display.

Figure 2C:
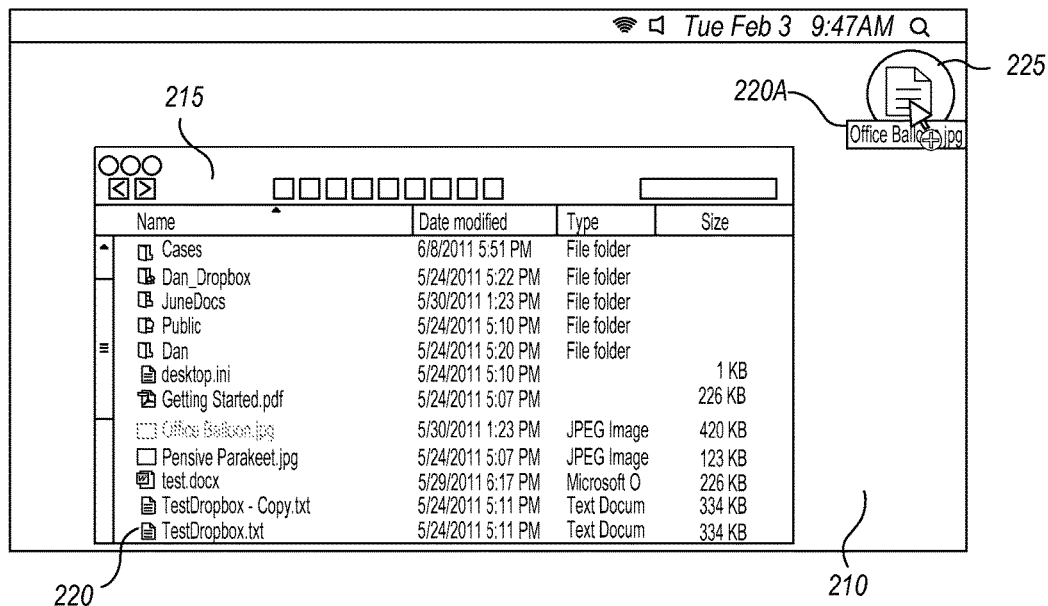
Figure 2D:
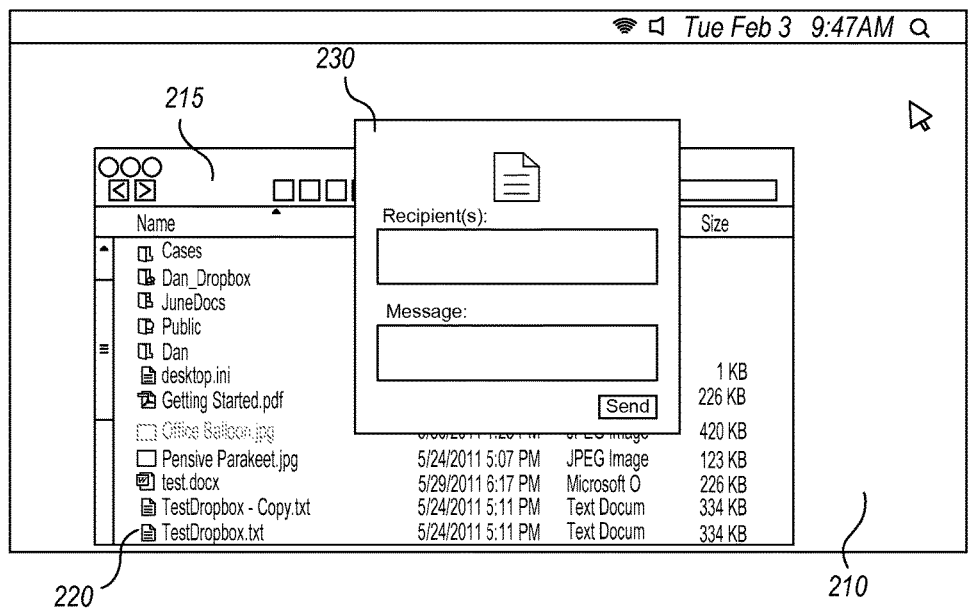

As shown in FIG. 2C, if a file 220A is dragged over sharing element 225 and "dropped" (released), request module 155 creates a request to automatically upload and share the file and sends the request to automatic link engine 105. In one embodiment, as shown in FIG. 2D, user interface module 157 displays a recipient element 230 that allows a user to input a recipient (e.g. by selecting from a list of possible recipients, or by entering a user name, e-mail address or other identifier via a keyboard or other input device, etc.). A recipient need not be a user of the content management system.

In another embodiment, the sharing element 225 corresponds to a pre-determined recipient or group of receipients.

Figure 2E:
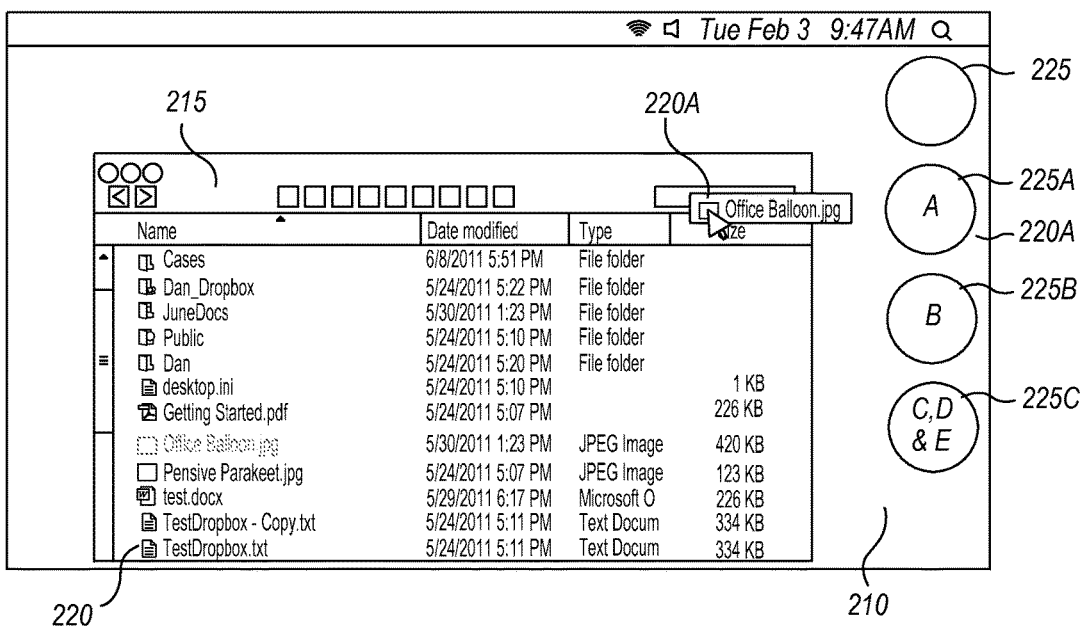

In this embodiment, the file is automatically uploaded to the content management system 100 and automatic link engine 105 generates and sends a share link to the recipient(s), as discussed below with respect to FIGS. 3 and 4. In various embodiments, there may be multiple sharing elements 225 corresponding to different recipients or groups of recipients. For example, in addition to the generic sharing element 225 discussed above, there may be three additional sharing elements 225A-C as shown in FIG. 2E. Each of the three sharing elements may correspond to a different recipient or group of recipients. In the example of FIG. 2E, sharing element 225A may correspond to recipient A, sharing element 225B may correspond to recipient B, and sharing element 225C may correspond to recipients C, D, and E. In one embodiment, the recipients that correspond to the sharing elements are determined by request module 157 based on file attributes. For example, a file 220A may be in a 'Work' folder. The sharing elements may correspond to recipients with whom the sharing user has previously shared files from the 'Work' folder. Similarly, the recipients may be determined based on other file attributes (e.g., file type, etc.). In other embodiments, recipients displayed in sharing elements may be determined based on other criteria (e.g., based on recently shared files, based on a choice of the sharing user, etc.).

Figure 3:
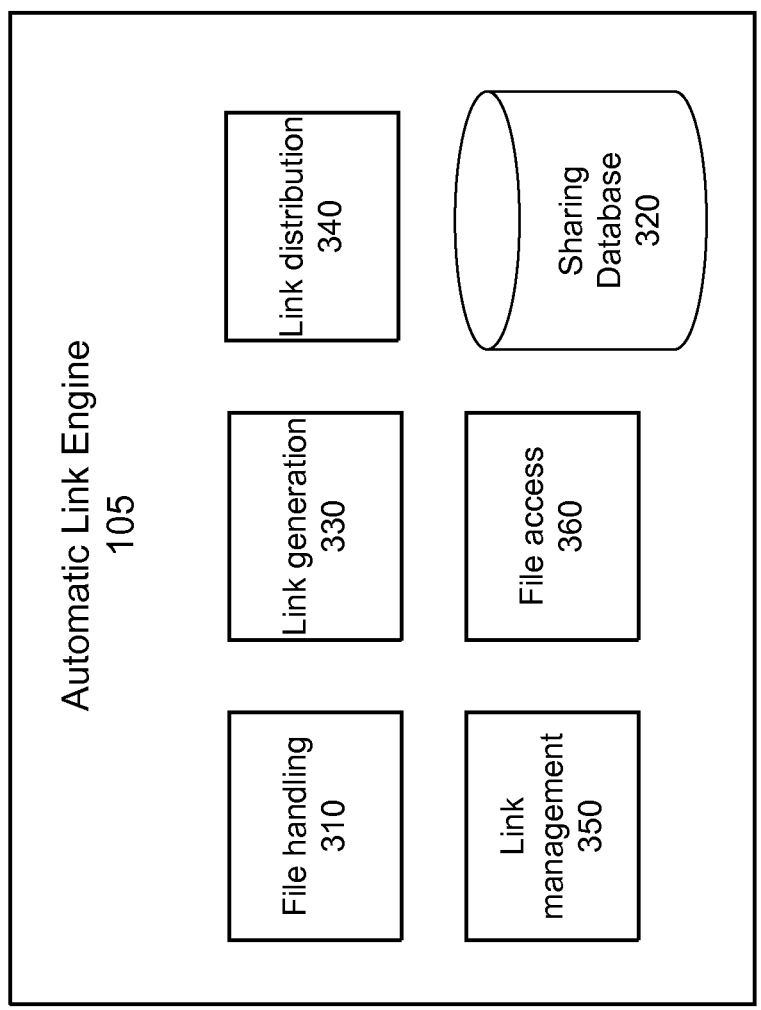
FIG. 3 is a block diagram illustrating the components of an automatic link engine, according to one embodiment.

FIG. 3 is a block diagram illustrating the components of the automatic link engine 105 of FIG. 1A, according to one embodiment. Automatic link engine 105 enables automatic upload, link generation, and link sharing for a file designated by a user of content management system 100.

Automatic link engine 105 comprises a file handling module 310 for handling sharing requests from clients 110, a link generation module 330 for generating links and specifying corresponding files to be shared, a link distribution module 340 for facilitating distribution of the links to other users, a link management module 350 for viewing and removing previously generated links, and a file access module 360 for accessing the files via the generated links. Automatic link engine 105 comprises a sharing database 320, which specifies sets of files to be shared and a mapping between the shared files and the links used to reference them. For example, the sharing database might comprise a set of pairs, each pair mapping a particular object to a unique link (e.g., a URL) by which the object can be accessed. Files uploaded to content management system 100 are stored in file database 103.

Figure 4:
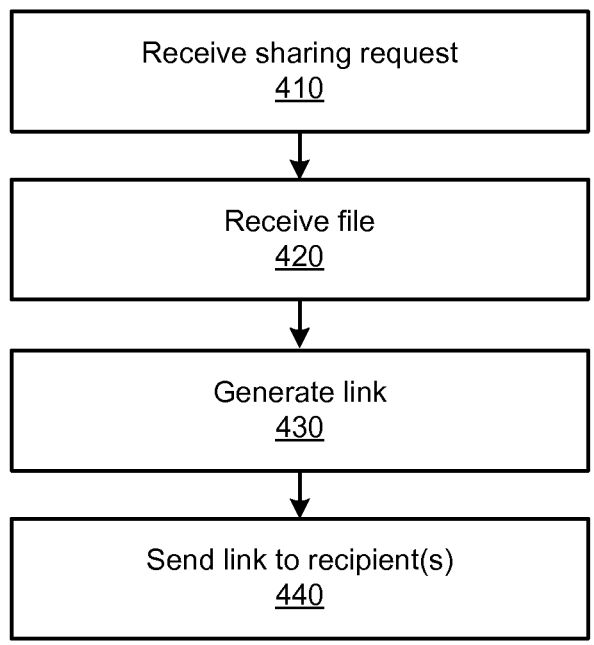
FIG. 4 is a flowchart of an example process for the automatic upload, link generation and link sharing for a file.

FIG. 4 is a flowchart of an example process for the automatic upload, link generation and link sharing for an object. Request management module 310 receives 410 a sharing request from a client 110. A sharing request may be sent by client software of a client 110 responsive to a user interface input. An example user interface is discussed above with respect to FIGS. 2A-E. Additional example embodiments of request initiation and the user interface are discussed below with respect to FIGS. 5A-B. In one embodiment, a sharing request includes a reference to an object and one or more recipients. In another embodiment, a sharing request may include a message from the sharer to the recipient(s). Request management module 310 may store the contents of a sharing request in sharing database 320 so that the modules of automatic link engine 105 may retrieve the requisite information for completing the sharing process at a later time.

Request management module 310 receives 420 the object from the client 110. In one embodiment, the object to which the sharing request corresponds is stored in client storage 190 and may include a single file or a set of files, or a container of files such as one or more folders, or even particular logical content such as a particular time sequence of a video file, particular slides of a presentation file, or particular records from a database constructed from multiple files. Request management module 310 stores the object in file database 103.

Link generation module 330 generates 430 a link corresponding to the object specified by the sharing request. The link unambiguously identifies within automatic link engine 105 the object to which it corresponds. In one embodiment, upon receiving a request to share a particular object, the link generation module 330 generates an objectidentifier (ID) unambiguously describing the object to be shared and a unique character string that identifies a name of the object (e.g., a uniform resource indicator (URI)) that serves as the link, and then saves an association of the object descriptor and the URI in the sharing database 320. In one embodiment, the URI is a uniform resource locator (URL).

Link distribution module 240 sends 440 the generated link to the recipient(s) specified in the sharing request. Link distribution module 240 may send the link to the recipient(s) by email or similar messaging service, and/or by a message service of content management system 100. In one embodiment, link distribution module 240 sends the generated link to the client 110 that originated the sharing request.

In one embodiment, steps 430 and 440 may occur before or at the same time as step 420, which means that the link is generated and/or sent at the same time or before an object is stored in file database 103. This allows the link to be provided without having to wait for the object to be stored in file database 103. In this embodiment, the link may refer to a storage location where the file will be stored once the storage operation is complete, and the file may not be accessible until that time. In another embodiment, step 420 occurs before steps 430 and 440, such that the object is stored in file database 103 before a link is generated and sent to the recipient(s).

In one embodiment, link management module 350 permits a user to manage previously-generated links. For example, a user may cause the link management module 350 to query the sharing database 320 for all the links that have been sent for that sharer and to display a list of the links. Each link has associated "Get link" and "Remove" actions. The "Get link" action displays the text of the link (e.g., URL) for dissemination by the sharer. The "Remove" action revokes access to recipients via that link, such as by deleting the entry for that link from the sharing database 320. Thus, no matter how large the set of recipients—and thus access to the corresponding object—the sender can quickly and easily revoke the access simply by removing the link.

The file access module 360 provides the shared object and/or representations thereof to clients 110 in response to requests made via the generated link. For example, assume that responsive to a sharing request of the client 110A of FIG. 1A, link generation module 230 generated a shortened link http://db.tt/xOFounw to a folder named "JuneDocs" with an object ID of 3D8B99 and link distribution module 340 shared the link with a user of the client 110B. When the user clicks on or otherwise selects the link via the email or social networking service, a browser application on the client 110B sends a corresponding request to the automatic link engine 105. For the example in which the link is the URL http://db.tt/xOFounw, the browser sends an HTTP request to the host db.tt, which is a domain name of the content management system 100, including the parameter xOFounw. The request is handled by the file access module 360, which locates the entry in the sharing database 320 corresponding to the parameter and extracts the associated object ID (namely, 3D8B99). Alternatively, if the folder is associated with a longer link https://www.service.com/s/28rtiz608u2mnco/newdoc.pdf, and this longer link is in turn associated with a shorter link http://db.tt/xOFounw, then the file access module first obtains the longer link from the shortened link using the link shortening service used to create the shortened link, and then determines the object from the longer link and the sharing database 320. (If the link has been removed, e.g. via the "Remove" action, the sharing database 320 will not contain an entry for that link. Thus, the file access module 360 will accordingly prevent access to the object by informing the user requesting the access to the object that the object is not available.) In one embodiment, the entity that receives and accesses the shared link may be a visitor 120, i.e., not a registered user of content management system 100.

In one embodiment, the file access module 360 displays a representation of the object using a native application or plug-in corresponding to the object. In one embodiment, if the entity accessing the shared resources by shared link is a registered user of content management system 100, the user has an option of copying the shared files to his or her own file space on file server 103. In one embodiment, the copy is a static copy, such that if the original sharing user makes subsequent changes to the shared file, the changes are not reflected in the version of the file copied by the user with whom the link was shared.

Additional Example User Interfaces

Figure 5A:
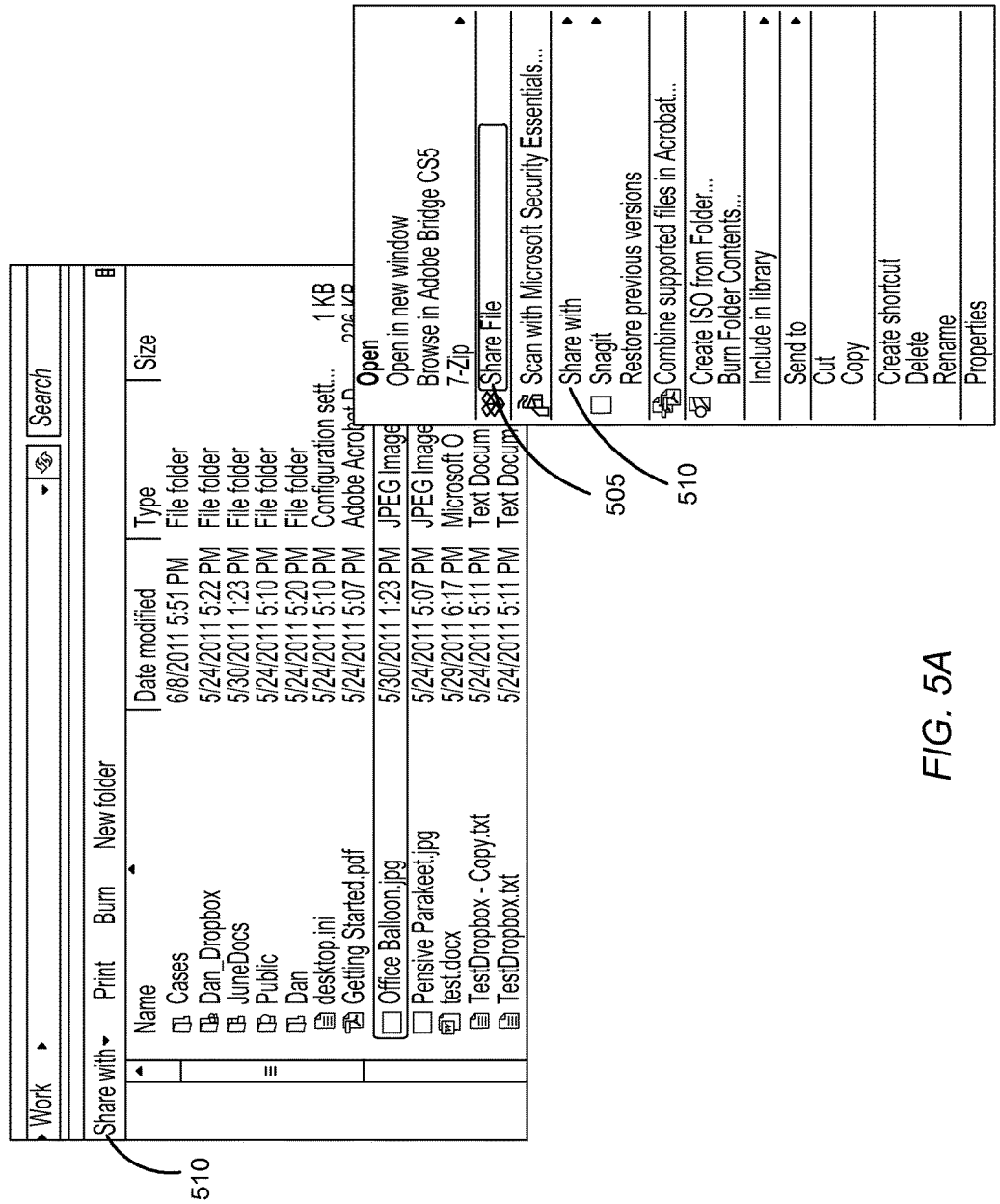
FIGS. 5A-B show example user interfaces for automatically uploading and sharing a file.

The sharing request can be initiated by users of clients 110 in different manners in different embodiments. For example, the request can be made using the user interface provided by the client software running on the clients 110, such as the example user interface of FIGS. 2A-E. Further examples include designating a file within a file browser application and choosing a "Share file" option 505 from a resulting context-sensitive menu, as depicted in FIG. 5A. In one embodiment, choosing the "Share file" option 505 results in the display of a user interface element similar to recipient element 230 of FIG. 2D. In the example user interface of FIG. 5A, a user may also initiate a sharing request by choosing the "Share with" option 510 from the file explorer application or context-sensitive menu and choosing one or more recipients of the file.

Figure 5B:
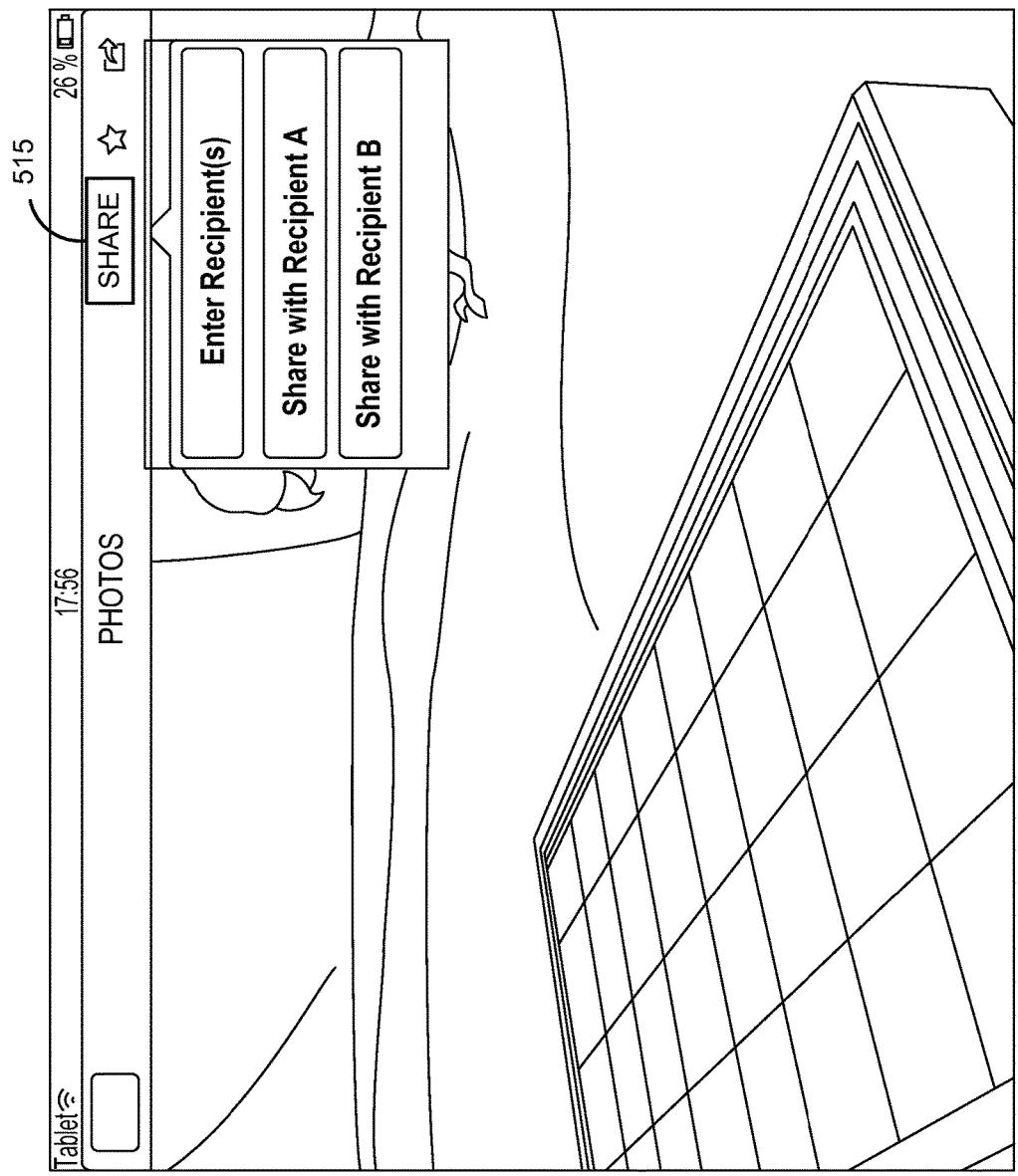

In another embodiment, the request can be initiated by clicking a link icon 515 within a file viewing application on a client 110, as depicted in FIG. 5B. As another example, the request can be made from a web-based interface provided by the file access server 100, in which the user interface for initiating a sharing request is similar to the user interface of FIG. 2A-E, but the sharing element(s) are displayed in a browser window.

File Organization and Synchronization

In one embodiment, when a file is shared according to the process of automatically uploading the file, generating a link to the file, and sending the specified recipients, the file is stored locally on client 110. In another embodiment, the file is synchronized with content management system 100. Thus, if the file is updated on a client 110 after being stored in file storage 103, the changes may be synchronized to the copy of the file stored in file storage 103, as well as with any other clients 110 synchronizing the file.

In one embodiment, shared files stored locally on client 110 are automatically organized together, for example in a "Shared Items" folder. Files may be organized by various parameters, including sharing date, recipient(s), folder from which file was shared, type of file, whether the file has been accessed by recipient(s), etc.

In the embodiment using synchronization, each client 110 executes a synchronization client application through which files of that client are specified for synchronization. The synchronization client application then provides the specified files to the content management system 100. The specified files are then provided to other ones of the clients 110, either by "push" in which the content management system 100 provides the files to the clients associated with a user who provided the files, or by "pull" in which the clients request the files from the file access server. The synchronization client applications and the content management system 100 also ensure that changes to the synchronized files are likewise reflected across all associated clients 110.

In one embodiment, the synchronization client applications use local peer-to-peer synchronization for greater efficiency and do not require use of the content management system 100. For example, devices associated with the same user or having access to the same shared folder can determine whether they are on the same local area network, and if so establish a secure connection (e.g., via SSL) and effect synchronization through peer-to-peer transfer of files.

The synchronized files are typically provided only to clients 110 associated with a user who provided the files. For example, if a particular user registers his desktop, laptop, and handheld device with the content management system 100 as his or her client devices 110, then the file access server and the synchronization applications on those three devices will synchronize the files with those devices and otherwise make the file available to the user via the user's login (e.g., via a web-based interface). However, the content management system 100 will not by default make the files available to devices of other users or via logins other than that of the user who provided the files.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    receiving, at a client device, a sharing request for an object that is not synchronized with a content management system, the object displayed within a first interface that is provided by an operating system of the client device, the client device including a folder synchronized with the content management system, the sharing request comprising a click-and-drag operation performed on the object within the first interface and moving the object from the first interface to the synchronized folder, wherein a client application that is provided by the content management system and is executing on the client device, responsive to detecting the click-and-drag operation, transmits a command to the client device to display a sharing element within a second user interface generated by the client application, the sharing element including a field to allow a user to enter a recipient and prompting the user to identify the recipient with whom the object is to be shared; and
    responsive to receiving the sharing request:
        storing the object in the synchronized folder;
        sending the object to the content management system for storage by the content management system in a location corresponding to the synchronized folder of the client device; and
        sending the sharing request to an automatic link engine of the content management system configured to automatically generate and send to the recipient a link corresponding to the location of the content management system corresponding to the synchronized folder of the client device.

2. The method of claim 1, wherein receiving the sharing request further comprises:
    responsive to detecting the click-and-drag operation, displaying a plurality of sharing elements within the second user interface displayed by the client application, each of the plurality of additional sharing elements associated with a particular recipient and configured to receive a user input to initiate the sharing request identifying the particular recipient.

3. The method of claim 1, wherein the object is sent to the content management system via a synchronization operation between the synchronized folder and the location of the content management system corresponding to the synchronized folder.

4. The method of claim 1, wherein the object is stored in the location of the content management system corresponding to the synchronized folder prior to being stored in the synchronized folder, and wherein the object is stored in the synchronized folder via a synchronization operation between the synchronized folder and the location of the content management system corresponding to the synchronized folder.

5. The method of claim 1, wherein a directory of a file system of the client device comprises a plurality of previously shared objects stored in the synchronized folder.

6. The method of claim 5, wherein each of the plurality of previously-shared objects has metadata comprising at least one of an associated recipient, a sharing date, and an original directory from which the object was shared, and the objects are organized according to the metadata.

7. A method comprising:
    receiving, from a client device having a folder synchronized with a content management system, a sharing request comprising a click-and-drag operation moving an object that is not synchronized with the content management system to the folder, the object displayed within a first interface provided by an operating system of the client device, wherein a client application that is provided by the content management system and is executing on the client device, responsive to detecting the click-and-drag operation, transmits a command to the client device to display a sharing element within a second user interface generated by the client application and over all other interface elements displayed by the client application or the operating system that includes a field to allow a user to enter a recipient and that prompts a user to identify the recipient with whom the object is to be shared; and
    responsive to receiving the sharing request:
        receiving the object from the client device;
        storing the object in a location of the content management system synchronized with the synchronized folder of the client device, the object stored in the synchronized folder responsive to the sharing request;
        automatically generating a link corresponding to the location of the content management system synchronized with the synchronized folder; and
        sending the link to the recipient.

8. The method of claim 7, wherein the object is received from the client device via a synchronization operation between the synchronized folder and the location of the content management system synchronized with the synchronized folder.

9. The method of claim 7, wherein the object is stored in the location of the content management system synchronized with the synchronized folder prior to being stored in the synchronized folder, and wherein the object is stored in the synchronized folder via a synchronization operation between the synchronized folder and the location of the content management system synchronized with the synchronized folder.

10. A system comprising:
a processor configured to execute instructions;
a non-transitory, non-volatile storage medium containing instructions, which when executed by the processor cause the processor to perform the steps of:
receiving, at a client device, a sharing request for an object that is not synchronized with a content management system, the object displayed within a first user interface provided by an operating system of the client device, the client device including a folder synchronized with the content management system, the sharing request comprising a click-and-drag operation performed on the object within the first interface and moving the object from the first interface to the synchronized folder, wherein a client application that is provided by the content management system and is executing on the client device, responsive to detecting the click-and-drag operation, transmits a command to the client device to display a sharing element within a second user interface generated by the client application, the sharing element including a field to allow a user to enter a recipient and prompting the user to identify the recipient with whom the object is to be shared; and
responsive to receiving the sharing request:
storing the object in the synchronized folder;
sending the object to the content management system for storage in a location of the content management system corresponding to the synchronized folder; and
sending the sharing request to an automatic link engine of the content management system configured to automatically generate and send to the recipient a link corresponding to the location of the content management system corresponding to the synchronized folder of the client device.

11. The system of claim 10, wherein receiving the sharing request further comprises:
responsive to detecting the click-and-drag operation, displaying a plurality of additional sharing elements within the second user interface displayed by the client application, each of the plurality of sharing elements associated with a particular recipient and configured to receive a user input to initiate the sharing request identifying the particular recipient.

12. The system of claim 10, wherein the object is sent to the content management system via a synchronization operation between the synchronized folder and the location of the content management system corresponding to the synchronized folder.

13. The system of claim 10, wherein the object is stored in the location of the content management system corresponding to the synchronized folder prior to being stored in the synchronized folder, and wherein the object is stored in the synchronized folder via a synchronization operation between the synchronized folder and the location of the content management system corresponding to the synchronized folder.

14. The system of claim 10, wherein a directory of a file system of the client device comprises a plurality of previously shared objects stored in the synchronized folder.

15. The method of claim 1, wherein the sharing element is displayed within the second user interface over all other interface elements displayed by the client application or the operating system.

* * * * *